United States Patent [19]

Surles et al.

[11] Patent Number: 5,520,251

[45] Date of Patent: May 28, 1996

[54] METHOD FOR ACIDIZING OIL PRODUCING FORMATIONS

[75] Inventors: Billy W. Surles, Houston; Mark D. Looney, Stafford, both of Tex.

[73] Assignee: Texaco Inc., White Plains, N.Y.

[21] Appl. No.: 363,047

[22] Filed: Dec. 23, 1994

[51] Int. Cl.⁶ ...................................................... E21B 43/27
[52] U.S. Cl. ......................... 166/307; 507/238; 507/934; 166/902
[58] Field of Search ..................................... 166/271, 307, 166/902; 507/238, 267, 934

[56] References Cited

U.S. PATENT DOCUMENTS

| | | | |
|---|---|---|---|
| 3,720,265 | 3/1973 | Tate | 166/307 |
| 4,096,914 | 6/1978 | McLaughlin et al. | 166/307 |
| 4,574,050 | 3/1986 | Crowe et al. | 166/307 X |
| 4,670,163 | 6/1987 | Lindstrom et al. | 106/902 X |
| 4,734,259 | 3/1988 | Frenier et al. | 507/934 X |
| 5,188,179 | 2/1993 | Gay et al. | 166/902 X |
| 5,200,096 | 4/1994 | Williams et al. | 166/902 X |
| 5,336,441 | 8/1994 | Shah et al. | 507/934 X |
| 5,441,929 | 8/1995 | Walker | 507/267 |

OTHER PUBLICATIONS

"Secondary Deposition of Iron Compounds Following Acidizing Treatments", C. F. Smith, C. W. Crowe, and T. J. Nolan III, SPE–AIME, Dowell Div. of The Dow Chemical Co., *Journal of Petroleum Technology*, Sep. 1969.

"Evaluation of Agents for Preventing Precipitation of Ferric Hydroxide from Spent Treating Acid", C. W. Crow, Dowell Div. of Dow Chemical U.S.A., Member SPE–AIME, *SPE*–12497.

"Iron Control Additives for Limestone and Sandstone Acidizing of Sweet and Sour Wells", B. E. Hall, Chevron Geoscience Co., and W. R. Dill, Halliburton Services, Member of SPE–AIME, *SPE*–17157.

"The Planning, Execution, and Evaluation of Acid Treatment in Sandstone Formations", H. O. McLeod, Jr., L. B. Ledlow, and M. V. Till, Conoco Inc., Members SPE–AIME, *SPE*–11931.

*Primary Examiner*—George A. Suchfield
*Attorney, Agent, or Firm*—Kenneth R. Priem; James L. Bailey; Harold J. Delhommer

[57] ABSTRACT

An improved method for preventing iron precipitation from a spent oil well acidizing solution is disclosed. The acidizing solution is preceded into the tubular goods and formation by the injection of an iron sensitive, acid insensitive acidified surfactant solution.

9 Claims, No Drawings

METHOD FOR ACIDIZING OIL PRODUCING FORMATIONS

FIELD OF THE INVENTION

This invention relates to an improved method for acidizing an oil bearing formation to prevent precipitation of iron compounds in the formation following treatment.

BACKGROUND OF THE INVENTION

Acidizing of oil wells became a fact of life in the production of crude oil about a half century ago when it was discovered that a solution of hydrochloric acid injected into the formation would increase the extraction of crude oil from the formation. Almost as soon, it was discovered that the injection of this acid carried with it into the formation an iron scale from the tubing through which the acid was injected into the formation. The iron scale was dissolved from the pipe and added to iron-containing minerals from the formation. As the acid became spent through the reaction with materials in the formation and the iron itself, the pH of the spent acid began to rise and consequently, the solubility of the iron in the acidizing solution began to decrease. Precipitation of ferric hydroxide and other iron containing compounds cause serious damage to the flow channels in the formation and often would result in the formation producing less, not more, crude oil. Early calculations show that enormous amounts of iron would be carried into the formation and precipitated unless something was done.

One of the early attempts is described in an article "Secondary Deposition of Iron Compounds Following Acidizing Treatments", C. F. Smith, C. W. Crowe, and T. J. Nolan III, SPE-AIME, Dowell Div. of The Dow Chemical Co., *Journal of Petroleum Technology*, September 1969. This early article suggested adding sequestering agents to prevent the precipitation of iron. In a later article "Evaluation of Agents for Preventing Precipitation of Ferric Hydroxide from Spent Treating Acid", C. W. Crow, Dowell Div. of Dow Chemical U.S.A., Member SPE-AIME, *SPE*-12497, indicated that fifteen years later, in 1984, the treatment of choice was still to add sequestering agents or iron stabilizers to the acids in order to prevent the precipitation into the formation. It is notable that one of the co-authors of the 1969 article is the author of the 1984 article.

Later, in a 1988 article, "Iron Control Additives for Limestone and Sandstone Acidizing of Sweet and Sour Wells", B. E. Hall, Chevron Geoscience Co., and W. R. Dill, Halliburton Services, Member of SPE-AIME, *SPE*-17157, continues to discuss the prevention or iron precipitation through iron sequestration using ethylene diamine tetraacetic acid (EDTA), a well-known chelating agent for iron. A number of other strong chelating agents are discussed in the article.

A consistent theme runs through the discussion of acid treatment of subterranean oil bearing formations relating to the problems of iron precipitation as is discussed considerably in the 1983 article, "The Planning, Execution, and Evaluation of Acid Treatments in Sandstone Formations", H. O. McLeod, Jr., L. B. Ledlow, and M. V. Till, Conoco Inc., Members SPE-AIME, *SPE*-11931. This article discussed in detail the planning and design of acid treatments of formations and demonstrates the mindset of those skilled in the art with respect to the iron precipitation problem. It also recognizes the contribution to the problem of removal of mill scale from the interior surfaces of oil field tubing through which the acid is pumped for acidizing. A 1993 article in *World Oil*, "Remove Tubular Mill Scale to Improve Completions", Dave Bills, Ramco Tubular Services Ltd., Aberdeen, focuses on the mill scale contribution to the problem and suggests a number of recommendations for avoiding the contribution from the mill scale. While many of the suggestions have salutary applicability, they are either impossible or impractical to follow.

Accordingly, until now, for a half century the problem has existed with respect to the precipitation of iron hydroxide from the spent acid used in acidizing a formation. Another ineffective attempt to solve the problem was to treat the interior of the tubing with an acid solution to remove the mill scale and bring it back to the surface with sequestering agents, but in many cases even this is not feasible since many wells for which acidizing is a necessity, are completed in a way which prevents such circulation. Another attempt has been to push clean tubing down the interior of the production tubing such that production tubing is not contacted with the acid during the acidizing process.

As seen above, many attempts have been made to solve the problem of iron precipitation, but even after half a century the problem remains unsolved and a source of frustration for those in the oil production business.

Accordingly, it is an object of our invention to provide an improved method for the acidizing of producing formations penetrated by a wellbore such that at least the presence of mill scale in an acidizing solution is effectively eliminated.

SUMMARY OF THE INVENTION

The object of this invention is accomplished by our improved method of acidizing an oil producing formation which is penetrated by a wellbore and completed with tubing which joins the formation to production equipment on the surface. In the practice of our invention, prior to the injection of the acidizing solution through the tubing, an acidified solution of an acid insensitive, iron sensitive surfactant is injected through the tubing. The surfactant, being iron sensitive, reacts with the iron in the mill scale on the interior surface of the tubing through which the acid solution will subsequently be injected. The surfactant reacts with the iron and forms a film, more like a scum in a bathtub, which, when followed by the injecting of acidizing solution, prevents contact with the surface of the tubing by the acidizing solution and, therefore, prevents the reaction between the iron and the subsequently injected acid solution. The amount of surfactant injected is an effective amount to coat sufficient area of the tubing to significantly reduce the amount of iron contacted by the tubing mill scale. Thus, this component of the iron content in the acidizing solution is effectively eliminated.

Thus, the acidizing solution will pass through the tubular goods without picking up a significant quantity of iron and be more effective in the formation itself. The likelihood of precipitation of iron in the formation will be diminished. Iron may still be precipitated by virtue of the presence of an extraordinary amount of iron in the formation itself which materially depletes the strength of the acid and allows the pH to rise to a precipitating level. However, the prevention of the presence of the mill scale from the tubing makes other treatments such as sequestering agents, if used in the acid, more effective.

DETAILED DESCRIPTION OF THIS INVENTION

In the production of oil from a subterranean formation penetrated by a wellbore and communicating with the surface between the formation and production equipment on the surface through tubing or casing, commonly called tubular goods, the production of oil has, for at least half a century, been enhanced by the injection of an acid solution, usually hydrochloric acid or hydrofluoric acid to react with components of the producing formation to improve the permeability of the formation. This invention is an improvement over such acidizing method by providing that, prior to injecting the acid solution into the tubular goods, an aqueous solution of a surfactant selected for its properties of being sensitive to iron but insensitive to acid, is injected through the tubing in the wellbore. When we indicate that a surfactant is iron sensitive, we mean that it will readily react with iron, particularly the iron in the surface of the tubing through which it is injected and form a film, often more like a scum to coat the interior surface of the tubing. The selection of such a surfactant can be determined by simple tests by those who would practice this invention. When we say it is acid insensitive, we mean that the acid will not precipitate the surfactant. The film formed by the surfactant reacted with the iron will allow the acidizing solution to flow by through the tubing without materially degrading the film formed on the surface of the iron by the reaction of the iron sensitive surfactant with the iron of the tubing. Thus, the reaction between the iron and the acid, whereby iron would go into the acid solution, is effectively prevented.

While any surfactant which meets the above criteria is suitable, and it is likely that others will be found in the future, the most preferred classes of surfactants are long chain aliphatic acids, polyglycol esters of such acids and phosphated aryl ethoxylates with the phosphate aryl ethoxylates being especially preferred.

The long chain aliphatic acid useful for the practice of this invention would normally be those having about sixteen carbon atoms and above sixteen to about thirty, preferably from about twenty to about twenty-five carbon atoms, it being understood that mixtures of such aliphatic acids are acceptable, even though the number of carbon atoms in the aliphatic chain of some species may be more or less than set forth in the range preceding. In addition, these acids may be esterified with polyglycols, particularly polyethylene glycols, polyethyleneglycol esters of fatty acids. It is important that the glycol moiety be water soluble thus practically dictating that it be a polyethylene glycol, the number of glycol units in the chain being relatively unimportant. Diethylene glycol (mw=106) is useful as is a polyethylene glycol having a molecular weight of about 1,500, for example. The preferred species of iron sensitive acid in sensitive surfactants are the phosphated aryl ethoxylates. These materials are normally prepared by phosphating the ethylene oxide adduct of an aryl group having a labile hydrogen atom of sufficient strength to react with ethylene oxide. Normally, the aryl group would be a phenol or an alkyl substituted phenol, most preferably octylphenol or nonylphenol. Ethylene oxide is reacted with such compounds until an average of from about four to about twelve moles of ethylene oxide results. The nonionic surfactant thus produced is phosphated in a manner well known to those skilled in the art and may be used in the practice of this invention. Many commercial products are available which meet this basic criteria, the preferred such is sold as "TRYFAC" 5550 surfactant by Emory Chemical Company of Cincinnati, Ohio. It is a phosphated aryl ethoxylate having a density of 1.13.

The solution would contain from about 0.8% to about 4% by weight of the surfactant, preferably from about 1.5% to about 2.5% by weight with the amount of the solution to be injected. Prior to the injection of the surfactant solution, it is acidified to a pH of from about one to about four, preferably from about two to about three using an acid compatible with the acidizing solution to be used; i.e., hydrochlorine acid, hydrofluoric acid or acetic acid. Since this would occur at the well site, some of the formation acidizing solution itself could be used.

As the surfactant solution is injected through the tubing, the surfactant plates out by reacting through its iron sensitivity with the iron on the tubular surface. The amount of acidified surfactant injected would be from about 0.005 to about 0.03 gallons per square foot of surface area of the tubular goods, preferably from about 0.008 to about 0.015. Thus, one of ordinary skill in the art could make simple calculations in order to provide a sufficient and effective amount of an acid insensitive, iron sensitive acidified surfactant to react with at least a substantial amount of the iron on the surface of the tubing but yet not to unnecessarily inject surfactant into the formation itself, even though, when properly injected, the residuum of the surfactant invading the subterranean production zone would be insufficient to cause a significant damage to the formation. It is a plus of practice of this invention that we have found that the acidified iron sensitive, acid insensitive surfactant may be injected through the tubular goods at the same rate at which it is planned to subsequently inject the acidizing solution into the formation. Though not mandatory, such an injection rate provides for easy management of the acidizing job since the acidizing solution can follow the surfactant solution slug down the tubular goods and into the formation without the requirement for an adjustment in the injection rate.

While the injection of the acidified surfactant solution may not entirely prevent the pickup of iron from the tubing, surprisingly, the iron contribution from the mill scale during acidizing is dramatically reduced. Therefore, the addition of other agents to prevent iron precipitation is made more effective, if not eliminated.

EXAMPLE

The above-identified method was tested in the laboratory by taking six inch pipe nipple and flowing a 2% (by weight) acidified (pH of 2 with HCl) surfactant solution ("TRYFAC" 5550 surfactant—Emory Chemical, Cincinnati, Ohio). Water was then flowed through the nipple and through an untreated six inch pipe nipple. An equal amount of a 15% (by weight) solution of hydrochloric acid was flowed through each nipple with the effluent of each being collected. They were analyzed by atomic absorption analysis and showed that significant amounts of iron appeared in the untreated pipes effluent with only trace amounts of iron in the effluent from the treated pipe. Additional testing revealed that the protection offered by the film in the treated nipple lasted over several hours of acid injection, demonstrating that the improvement of this invention significantly reduces the danger of subsequent iron reprecipitation by prevention of the presence of iron from the tubular goods.

From the foregoing description and the above specific embodiments, those of ordinary skill in the art may make modifications and changes to the above improved method for acidifying oil wells without departing from the scope or intent of the above described invention.

We claim:

1. In a method for acidizing an oil producing formation penetrated by a wellbore and communicating with production equipment on the surface through tubular goods which comprises, injecting a formation acidizing solution through the tubular goods into the formation, the improvement for preventing iron precipitation from the acid solution in the formation which comprises the steps of:

injecting through the tubular goods, prior to injecting the formation acidizing solution, an effective amount of an acid insensitive, iron sensitive acidified surfactant solution through the tubing to react with iron on the surface of the tubing to form a film to prevent reaction between the iron and subsequently injected acidizing solution.

2. The method of claim 1 wherein the acidified surfactant solution has a pH of from about 1 to about 4.

3. The method of claim 1 wherein the amount of the acidified surfactant solution injected is from about 0.005 to about 0.03 gallons per square foot of surface area of the tubular goods.

4. The method of claim 3 wherein the surfactant solution contains from about 0.8% to about 4% by weight of the surfactant.

5. In a method for acidizing an oil producing formation penetrated by a wellbore and communicating with production equipment on the surface through tubular goods which comprises injecting a formation acidizing solution through the tubular goods into the formation, the improvement for preventing iron precipitation from the acidizing solution into the formation which comprises the steps of:

injecting through the tubular goods, prior to injection of the formation acidizing solution, from about 0.005 to about 0.03 gallons per square foot of surface area of the tubular goods of an acidified aqueous solution having a pH of from about 1 to about 4 containing from about 0.8% to about 4% by weight of an acid insensitive, iron sensitive surfactant selected from the group consisting of a long chain aliphatic acid having from about 16 to about 30 carbon atoms, polyethylene glycol ester of a fatty acid and phosphated aryl ethoxylates; whereby such surfactant reacts with the iron on the surface of the tubular goods to form a film to prevent reaction between the acid and the iron; and following the acidified surfactant solution by injecting the formation acidizing solution through the tubular goods into the formation.

6. The method of claim 5 wherein the surfactant solution is injected through the tubular goods at the same rate as the formation acidizing solution.

7. The method of claim 5 wherein the pH of the acidified surfactant is from about 2 to about 3.

8. The method of claim 5 wherein the surfactant is a phosphated aryl ethoxylate.

9. The method of claim 8 wherein the phosphated aryl ethoxylate is a phosphated alkylphenol ethoxylate having an average of from about four to about twelve moles ethylene oxide per molecule.

* * * * *